Sept. 1, 1942.   M. OLSEN   2,294,799
ATTACHMENT FOR WELDER'S SHIELDS
Filed Nov. 18, 1940
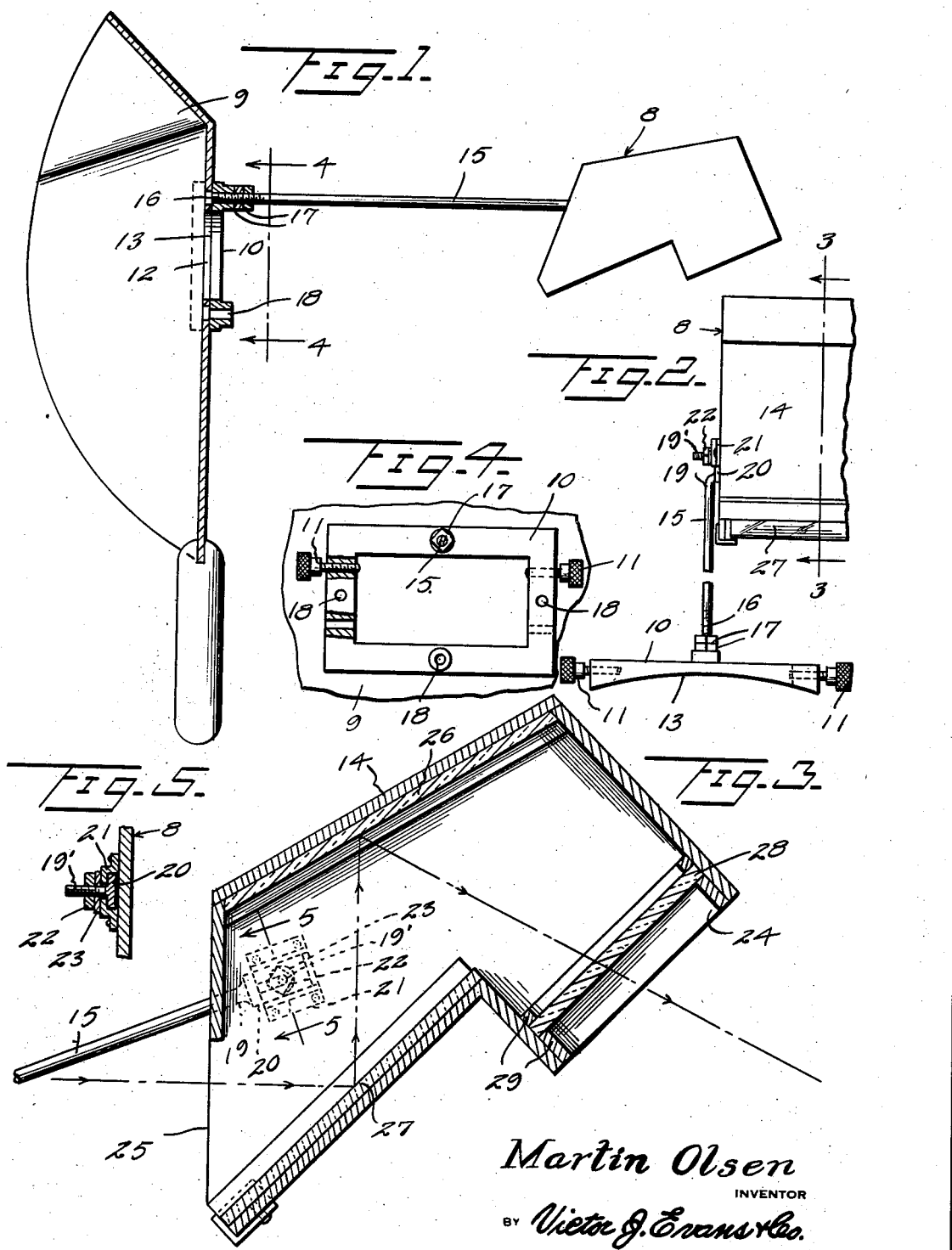
Martin Olsen
INVENTOR
BY Victor J. Evans & Co.
ATTORNEYS Patented Sept. 1, 1942

2,294,799

UNITED STATES PATENT OFFICE 2,294,799

ATTACHMENT FOR WELDERS' SHIELDS

Martin Olsen, Jersey City, N. J.

Application November 18, 1940, Serial No. 366,181

2 Claims. (Cl. 2—10)

The present invention relates to an attachment for a protective device, either in the form of a shield or helmet, used by welders for shielding the eyes and face from injurious light rays.

An important object of the invention is the provision of an attachment that will give the welder direct vision so as to allow him to weld beyond an obstruction.

Another object of the invention is to provide an attachment of the above character, that is capable of adjustment so that any position normally required in welding may be attained, being especially useful on repair jobs in the ship building industry and refining work.

The invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side elevational view, partly in section, showing the attachment secured to a welder's shield.

Figure 2 is a top plan view of the attachment.

Figure 3 is a vertical sectional view taken substantially on line 3—3 of Figure 2.

Figure 4 is a front elevational view of the open frame for securing the attachment to a welder's shield.

Figure 5 is a detail sectional view taken substantially on line 5—5 of Figure 3.

Referring to the drawing for a more detailed description thereof, the attachment is generally designated by the reference numeral 8 and is shown in Figure 1 secured to a welder's shield 9. The shield 9 is intended for protecting the face and eyes of the welder from injurious light rays, while the attachment 8 renders proper vision so as to allow him to weld beyond an obstruction.

The attachment 8 is secured to the shield 9 by means of an open substantially rectangular-shaped frame 10, said frame being removably secured to the shield by means of set screws 11 held in the side portions of the frame. The frame 10 surrounds the opening 12 conventionally formed in the shield 9 through which the welder obtains vision when performing a welding operation. The opening 12 is usually formed to hold a protection lens or glass. Referring more particularly to Figure 2 of the drawing, it will be observed that one face of the frame 10 is concaved as indicated at 13 to conform with the general contour of the shield 9.

The attachment further includes an arrangement of mirrors supported within a housing 14 which housing is held spaced from the shield 9 by means of the rod 15. One end of the rod 15 is exteriorly threaded as indicated at 16 and carries a lock nut 17, the threaded end of the rod adapted to be inserted in one of the openings 18 formed in the outer face of the frame 10. The position of the openings 18 allows for the positioning of the housing 14 at various angles relative to the shield 9 so that any position normally required in welding may be attained. The nut 17 locks the rod 15 within the frame 10. The other end 19 of the rod 15 is formed with a flattened portion 20 adapted to be held in the flanged clamp 21 which is secured to one side wall of the housing. A nut 22 and washer 23 are tightened against the clamp for retaining the flattened portion 20 therein.

The housing 14 is of the shape best shown in Figure 3 of the drawing and includes object and eye openings 24 and 25, respectively, located in each end of the housing in angularly related planes. Secured by any desired means within the housing are angularly related mirrors 26 and 27, respectively, the mirror 26 facing the object opening 24 while the mirror 27 faces the eye opening 25. The object opening 24 is provided with a lens 28 adapted to protect the mirrors 26 and 27 from the effects of welding smoke and flames, said lens being held within the opening by means of the confining rings 29.

The housing and mirrors constitute an image reflector, and the rod 15 may be rotated to arrange the image reflector in the required position with respect to the shield 9. As afore indicated, the threaded end 16 of the rod 15 may be disposed in any of the openings 18 and is secured in any position to which it may be adjusted by the lock nuts 17 which contact the open frame.

It is thought that the utility and advantages of the attachment are readily apparent from the above description when taken in connection with the accompanying drawing. When it is necessary for the welder to perform a welding operation beyond an obstruction, it is not always convenient for him to properly position the shield to obtain the full benefit of its protection and at the same time efficiently operate the welding tool. By means of the present invention, the image reflector is secured to the shield by means of the rod 15 and positioned so as to bring the work in the line of vision of the operator, the work being viewed from in back of the shield through the opening 12 and eye opening 25. In this position the work is reflected onto the mirror 26 and then onto the mirror 27 where it is viewed through the opening 25. The welder having attained a clear vision of his work can freely perform the welding operation.

Also it will be understood, of course, by those skilled in the art that variations in the hereinabove described device involving the substitution of substantial equivalents for the devices described are intended to be comprehended within the spirit of the present invention and that the invention is capable of extended application and is not confined to the exact showing of the drawing nor to the precise construction described and, therefore, such changes and modifications may be made therein as do not affect the spirit of the invention nor exceed the scope thereof as expressed in the appended claims.

What is claimed is:

1. In a device of the character described, a shield shaped to cover the front head and neck portion of a person, the said shield having a sight opening therein, a socket secured to the front of the shield adjacent the sight opening, and a rod detachably connected to the said socket and extending forwardly of the shield to support a periscopic reflector member on its outer end forwardly of the sight opening of the shield.

2. In a device of the character described, a shield shaped to cover the front head and neck portion of a person, the said shield having a sight opening therein, a rod secured to the front of the shield and extending forwardly thereof, and a periscopic reflector member mounted on the outer end of the said rod in a position spaced substantially from the said shield.

MARTIN OLSEN.